United States Patent
Hsu (10) Patent No.: US 11,407,895 B2
(45) Date of Patent: Aug. 9, 2022

(54) RESIN COMPOSITION AND ARTICLE MADE THEREFROM

(71) Applicant: Elite Material Co., Ltd., Taoyuan (TW)

(72) Inventor: Ching-Hsien Hsu, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 197 days.

(21) Appl. No.: 16/923,315

(22) Filed: Jul. 8, 2020

(65) Prior Publication Data

US 2021/0371655 A1 Dec. 2, 2021

(30) Foreign Application Priority Data

May 29, 2020 (TW) .................. 109118008

(51) Int. Cl.
| | |
|---|---|
| *B32B 27/26* | (2006.01) |
| *B32B 27/28* | (2006.01) |
| *B32B 27/38* | (2006.01) |
| *C08G 59/24* | (2006.01) |
| *C08G 59/50* | (2006.01) |
| *C08L 79/08* | (2006.01) |
| *C08L 63/00* | (2006.01) |
| *C08J 5/24* | (2006.01) |

(52) U.S. Cl.
CPC .............. *C08L 79/08* (2013.01); *B32B 27/26* (2013.01); *B32B 27/281* (2013.01); *B32B 27/38* (2013.01); *C08G 59/245* (2013.01); *C08G 59/5033* (2013.01); *C08J 5/24* (2013.01); *C08L 63/00* (2013.01); *C08J 2379/08* (2013.01); *C08J 2463/00* (2013.01); *C08L 2203/20* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 4,447,586 A | * | 5/1984 | Shimp ..................... | C08G 59/68 |
| | | | | 252/182.13 |
| 5,393,806 A | * | 2/1995 | Azarnia ............. | C08G 59/5033 |
| | | | | 523/400 |
| 2015/0114693 A1 | * | 4/2015 | Moon ...................... | C08K 3/34 |
| | | | | 523/467 |

* cited by examiner

*Primary Examiner* — Michael J Feely
(74) *Attorney, Agent, or Firm* — Muncy, Geissler, Olds & Lowe, P.C.

(57) ABSTRACT

A resin composition includes 60 parts by weight of a maleimide resin; 10 parts by weight to 30 parts by weight of an epoxy resin of Formula (I), wherein n represents an integer of 0 to 10: and 2 parts by weight to 40 parts by weight of a methylenebis (diethylaniline). Moreover, an article may be made from the resin composition, including a prepreg, a resin film, a laminate or a printed circuit board.

Formula (I)

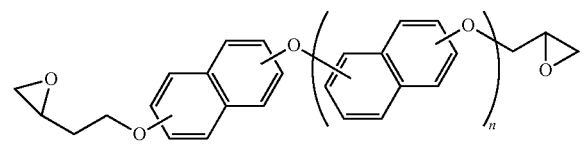

11 Claims, 1 Drawing Sheet

RESIN COMPOSITION AND ARTICLE MADE THEREFROM

CROSS-REFERENCE TO RELATED APPLICATION

This application claims the priority benefits of Taiwan Patent Application No. 109118008, filed on May 29, 2020. The entirety the above-mentioned patent application is hereby incorporated by reference herein and made a part of this specification.

BACKGROUND

1. Field of the Disclosure

The present disclosure relates to a resin composition and an article made therefrom, more particularly to a resin composition useful for preparing a prepreg, a resin film, a laminate or a printed circuit board.

2. Description of Related Art

A system in a package (SiP) is an advanced printed circuit board packaging technology in which multiple chips and a number of components such as passive components, capacitors, resistors, connectors, etc. are enclosed in one package to achieve the purpose of miniaturization and high performance. Since the SiP technology involves integrating multiple active components and passive components in one package, it is prone to large amount of heat dissipation during operation of the components, which may lead to dimensional change problem due to thermal expansion. Therefore, printed circuit boards used for the SiP technology require materials with low dimensional change and low deformation under heat.

SUMMARY

To overcome the problems of prior arts, particularly one or more above-mentioned technical problems facing conventional materials, it is a primary object of the present disclosure to provide a resin composition and an article made therefrom which may overcome at least one of the above-mentioned technical problems.

To achieve the above-mentioned objects, the present disclosure provides a resin composition, comprising:
60 parts by weight of a maleimide resin;
10 parts by weight to 30 parts by weight of an epoxy resin of Formula (I):

Formula (I)

wherein n is an integer of 0 to 10, such as but not limited to an integer of 1 to 10 or an integer of 0 to 5, such as 0, 1, 2, 3, 4 or 5; and
2 parts by weight to 40 parts by weight of a methylenebis (diethylaniline).

For example, in one embodiment, relative to 60 parts by weight of the maleimide resin, the resin composition comprises 5 parts by weight to 30 parts by weight of the methylenebis(diethylaniline).

For example, in one embodiment, examples of the maleimide resin are not particularly limited and may comprise various maleimide resins known in the art to which this disclosure pertains; examples include 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylenebismaleimide, 1,6-bismaleimide-(2,2,4-trimethyl)hexane, N-2,3-xylylmaleimide, N-2,6-xylylmaleimide, N-phenylmaleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

For example, in one embodiment, the resin composition further comprises polyphenylene ether resin, cyanate ester resin, active ester, vinylbenzyl-dicyclopentadiene phenylene ether, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, epoxy resin, phenolic resin, benzoxazine resin, styrene maleic anhydride resin, polyamide, polyimide, or a combination thereof. Unless otherwise specified, these components should be construed as including their modifications.

For example, in one embodiment, the resin composition further comprises flame retardant, inorganic filler, curing accelerator, polymerization inhibitor, solvent, silane coupling agent, surfactant, coloring agent, toughening agent, core-shell rubber, or a combination thereof.

Another main object of the present disclosure is to provide an article made from the aforesaid resin composition, comprising a prepreg, a resin film, a laminate or a printed circuit board.

For example, in one embodiment, articles made from the resin composition disclosed herein have one, more or all of the following properties:
absence of weave exposure under visual inspection;
a glass transition temperature as measured by reference to IPC-TM-650 2.4.24.4 of greater than or equal to 260° C.;
a percentage of storage modulus change between 50° C. and 250° C. as measured by reference to IPC-TM-650 2.4.24.4 of less than or equal to 20%;
an X-axis thermal expansion coefficient as measured by reference to IPC-TM-650 2.4.24.5 of less than or equal to 8.9 ppm/° C.;
a dielectric constant as measured by reference to JIS C2565 at 10 GHz of less than or equal to 3.99;
a dissipation factor as measured by reference to JIS C2565 at 10 GHz of less than or equal to 0.0071; and
a copper foil peeling strength as measured by reference to IPC-TM-650 2.4.8 of greater than or equal to 4.0 lb/in.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "comprises," "comprising," "includes," "including," "encompass," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed but inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of $X_1$, $X_2$ and $X_3$" and Y is described as being "selected from a group consisting of $Y_1$, $Y_2$ and $Y_3$," the disclosure includes any combination of X is $X_1$ and/or $X_2$ and/or $X_3$ and Y is $Y_1$ and/or $Y_2$ and/or $Y_3$.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A prepolymer refers to a polymer having a lower molecular weight between the molecular weight of monomer and the molecular weight of final polymer. For example, according to the present disclosure, a prepolymer of diallyl compound and maleimide resin refers to a product with an intermediate molecular weight obtained by subjecting the diallyl compound and maleimide resin to a certain degree of polymerization, the intermediate molecular weight being greater than the molecular weight of the diallyl compound and maleimide resin before reaction but less than the molecular weight of the final product obtained from a complete reaction; in addition, the prepolymer contains a reactive functional group capable of participating further polymerization to obtain the final high molecular weight product which has been fully crosslinked or cured. The term "polymer" includes but is not limited to an oligomer. An oligomer refers to a polymer with 2-20, typically 2-5, repeating units. For example, the term "diene polymer" as used herein is construed as comprising diene homopolymer, diene copolymer, diene prepolymer and diene oligomer. For example, the term "(meth)acrylate polymer" as used herein is construed as comprising (meth) acrylate homopolymer, (meth)acrylate copolymer, (meth) acrylate prepolymer and (meth)acrylate oligomer.

Unless otherwise specified, the term "resin" of the present disclosure is a widely used common name of a synthetic polymer and is construed as comprising monomer and its combination, polymer and its combination or a combination of monomer and its polymer, but not limited thereto. For example, in the present disclosure, the term "maleimide resin" is construed to encompass a maleimide monomer, a maleimide polymer, a combination of maleimide monomers, a combination of maleimide polymers, and a combination of maleimide monomer(s) and maleimide polymer(s).

For example, in the present disclosure, the term "vinyl-containing" is construed to encompass the inclusion of a vinyl group, an allyl group, a (meth)acrylate group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from homopolymerizing a resin, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated carbon-carbon double bond with the potential of being crosslinked with other functional groups, but not limited thereto.

Unless otherwise specified, according to the present disclosure, when the term acrylate or acrylonitrile is expressed as (meth)acrylate or (meth)acrylonitrile, it is intended to comprise both situations of containing and not containing a methyl group; for example, poly(meth)acrylate is construed as including polyacrylate and polymethacrylate. For example, (meth)acrylonitrile is construed as including acrylonitrile and methacrylonitrile.

Unless otherwise specified, an alkyl group and an alkenyl group described herein are construed to encompass various isomers thereof. For example, a propyl group is construed to encompass n-propyl and iso-propyl.

It should be understood that all features disclosed herein may be combined in any way to constitute the solution of the present disclosure, as long as there is no conflict present in the combination of these features.

Unless otherwise specified, as used herein, part(s) by weight represents weight part(s) in any weight unit, such as but not limited to kilogram, gram, pound and so on. For example, 100 parts by weight of the maleimide resin may represent 100 kilograms of the maleimide resin or 100 pounds of the maleimide resin.

The following embodiments and examples are illustrative in nature and are not intended to limit the present disclosure and its application. In addition, the present disclosure is not bound by any theory described in the background and summary above or the following embodiments or examples. Unless otherwise specified, processes, reagents and conditions described in the examples are those known in the art.

Generally, the present disclosure provides a resin composition, comprising:

60 parts by weight of a maleimide resin;

10 parts by weight to 30 parts by weight of an epoxy resin of Formula (I):

Formula (I)

wherein n is an integer of 0 to 10; and 2 parts by weight to 40 parts by weight of a methylenebis (diethylaniline).

For example, in one embodiment, the maleimide resin of the present disclosure comprises a monomer containing at least one maleimide group, its polymer, or a combination thereof. Unless otherwise specified, the maleimide resin used in the present disclosure is not particularly limited and may include any one or more maleimide resins useful for preparing a prepreg, a resin film, a laminate or a printed circuit board. In some embodiments, the maleimide resin may comprise 4,4'-diphenylmethane bismaleimide, polyphenylmethane maleimide (a.k.a. oligomer of phenylmethane maleimide), bisphenol A diphenyl ether bismaleimide, 3,3'-dimethyl-5,5'-diethyl-4,4'-diphenylmethane bismaleimide (a.k.a. bi s-(3-ethyl-5-methyl-4-maleimidephenyl) methane), 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, vinyl benzyl maleimide (VBM), maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof. Unless otherwise specified, the maleimide resins described above should be construed as including the modifications thereof.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Industry Co., Ltd., or products such as BMI-70 and BMI-80 available from K.I Chemical Industry Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 available from Designer Molecules Inc.

As described above, the resin composition according to the present disclosure contains an epoxy resin of Formula (I), which has in its structure at least one naphthalene ring and at least one ether group. If the epoxy resin of Formula (I) contains two or more naphthalene rings, one of the naphthalene rings is bonded with the adjacent naphthalene ring via an oxygen atom (i.e., ether bond). In addition, in the structure of Formula (I), n is an integer of 0 to 10, such as but not limited to an integer of 1 to 10, an integer of 0 to 5 or an integer of 1 to 5, such as 0, 1, 2, 3, 4 or 5. In addition, unless otherwise specified, the epoxy resin of Formula (I) may comprise any one or more epoxy resins having the structure of Formula (I) or a combination thereof. For example, the epoxy resin of Formula (I) may comprise any epoxy resin having a structure with n being 0, 1, 2, 3, 4 or 5 and may also comprise a mixture containing any two or more of the epoxy resins. In other words, the epoxy resin of Formula (I) may comprise one, two or more epoxy resins having the structure of Formula (I).

For example, in one embodiment, based on 60 parts by weight of the maleimide resin, the resin composition according to the present disclosure comprises 10 parts by weight to 30 parts by weight of the epoxy resin of Formula (I).

As described above, the resin composition according to the present disclosure comprises methylenebis(diethylaniline). Unless otherwise specified, the methylenebis(diethylaniline) may be any isomer thereof or a combination of two or more isomers. For example, in one embodiment, the resin composition according to the present disclosure comprises 4,4'-methylenebis(2,6-diethylaniline), as shown below:

For example, in one embodiment, based on 60 parts by weight of the maleimide resin, the resin composition according to the present disclosure comprises 2 parts by weight to 40 parts by weight of the methylenebis(diethylaniline). In another embodiment, based on 60 parts by weight of the maleimide resin, the resin composition according to the present disclosure comprises 5 parts by weight to 30 parts by weight of the methylenebis(diethylaniline).

Unless otherwise specified, in the resin composition according to the present disclosure, main components such as the maleimide resin, the epoxy resin of Formula (I) and the methylenebis(diethylaniline) are contained independently in the resin composition and are not contained as a prepolymer thereof in the resin composition. For example, in the resin composition according to the present disclosure, the maleimide resin and the methylenebis(diethylaniline) are not present as a prepolymer thereof in the resin composition.

In one embodiment, for example, the resin composition disclosed herein may further optionally comprise polyphenylene ether resin, cyanate ester resin, active ester, vinylbenzyl-dicyclopentadiene phenylene ether, bis(vinylbenzyl) ether, 1,2-bis(vinyl phenyl)ethane, divinylbenzene, triallyl isocyanurate, triallyl cyanurate, 1,2,4-trivinyl cyclohexane, diallyl bisphenol A, styrene, acrylate, polyolefin, epoxy resin (which is different from the epoxy resin of Formula (I)), phenolic resin, benzoxazine resin, styrene maleic anhydride resin, polyamide, polyimide, or a combination thereof. Unless otherwise specified, these components should be construed as including their modifications. Unless otherwise specified, relative to 60 parts by weight of the maleimide resin, any component described above may range from 1 part by weight to 100 parts by weight, such as 1 part by weight to 50 parts by weight, and the ratio therebetween can be adjusted according to the need.

In one embodiment, for example, the polyphenylene ether (a.k.a. polyphenylene oxide) resin used herein is not particularly limited and may comprise various polyphenylene ether resins known in the art to which this disclosure pertains, such as but not limited to a hydroxyl-terminated polyphenylene ether, a vinyl-containing polyphenylene ether, or a combination thereof. Preferably, the polyphenylene ether resin comprises a vinyl-containing polyphenylene ether. The vinyl-containing polyphenylene ether suitable for the present disclosure is not particularly limited and may comprise any one or more commercially available products, self-prepared products, or a combination thereof. In some embodiments, the vinyl-containing polyphenylene ether may include: vinylbenzyl-terminated polyphenylene ether (e.g., OPE-2st available from Mitsubishi Gas Chemical Co., Inc.), methacrylate-terminated polyphenylene ether (e.g., SA9000 available from Sabic), vinylbenzyl-terminated bisphenol A polyphenylene ether, vinyl-containing chain-extended polyphenylene ether, or a combination thereof. The vinyl-containing chain-extended polyphenylene ether may include various polyphenylene ethers disclosed in the US Patent Application Publication No. 2016/0185904 A1, all of which are incorporated herein by reference in their entirety.

For example, the cyanate ester resin suitable for the present disclosure is not particularly limited and may be any compound with an Ar—O—C≡N structure, wherein Ar represents a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin, or a combination thereof. The novolac cyanate ester resin may comprise bisphenol A novolac cyanate ester resin, bisphenol F novolac cyanate ester resin, phenol novolac cyanate ester resin or a combination thereof. For example, the cyanate ester resin may be available under the product name primaset PT-15, PT-30S, PT-60S, BA-200, BA-230S, BA-3000S, BTP-2500, BTP-6020S, DT-4000, DT-7000, ULL-950S, HTL-300, CE-320, LUT-50 or LeCy sold by Lonza.

For example, the active ester suitable for the present disclosure may be any active polyester resins known in the field to which this disclosure pertains, including but not limited to various commercially available active polyester resin products. Examples include, but are not limited to, active polyester resin products HPC-8000 and HPC-8150 available from D.I.C. Corporation.

For example, the vinylbenzyl-dicyclopentadiene phenylene ether is not particularly limited and may comprise but not limited to a structure below:

wherein each $R_6$ independently represents hydrogen, a $C_1$-$C_{20}$ straight chain alkyl group, a $C_1$-$C_{20}$ cycloalkyl group or a $C_6$-$C_{20}$ aryl group; and n is an integer of 1 to 10; preferably, $R_6$ is hydrogen or methyl group and n is an integer of 1 to 3.

For example, the bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A or styrene suitable for the present disclosure is not particularly limited and may comprise various commercially available products.

For example, the acrylate suitable for the present disclosure is not particularly limited, examples including one or more acrylate compounds comprising two or more unsaturated bonds per molecule and various commercially available mono-functional acrylates.

For example, the polyolefin suitable for the present disclosure is not particularly limited and may comprise any one or more commercially available products, self-prepared products or a combination thereof. Examples include but are not limited to styrene-butadiene-divinylbenzene terpolymer, hydrogenated styrene-butadiene-divinylbenzene terpolymer, styrene-butadiene-maleic anhydride terpolymer, hydrogenated styrene-butadiene-maleic anhydride terpolymer, vinyl-polybutadiene-urethane oligomer, styrene-butadiene copolymer (such as but not limited to styrene-butadiene-styrene copolymer), hydrogenated styrene-butadiene copolymer, styrene-isoprene copolymer, hydrogenated styrene-isoprene copolymer, maleic anhydride-butadiene copolymer, polybutadiene (i.e., homopolymer of butadiene), or a combination thereof.

For example, in addition to the epoxy resin of Formula (I), the resin composition according to the present disclosure may optionally include one or more different epoxy resins. The epoxy resin suitable for the present disclosure may be any epoxy resins known in the field to which this disclosure pertains, including but not limited to bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may comprise DOPO-containing phenol novolac epoxy resin, DOPO-containing cresol novolac epoxy resin, DOPO-containing bisphenol-A novolac epoxy resin, or a combination thereof; the DOPO-HQ epoxy resin may comprise DOPO-HQ-containing phenol novolac epoxy resin, DOPO-HQ-containing o-cresol novolac epoxy resin, DOPO-HQ-containing bisphenol-A novolac epoxy resin, or a combination thereof.

For example, the phenolic resin suitable for the present disclosure may comprise, but not limited to, mono-functional, bifunctional or multifunctional phenolic resin, comprising the phenolic resin of a resin composition conventionally useful for making prepregs, such as phenoxy resin, phenol novolac resin, etc.

For example, the benzoxazine resin suitable for the present disclosure may include bisphenol A benzoxazine resin, bisphenol F benzoxazine resin, phenolphthalein benzoxazine resin, dicyclopentadiene benzoxazine resin, or phosphorus-containing benzoxazine resin, such as but not limited to LZ-8270 (phenolphthalein benzoxazine resin), LZ-8280 (bisphenol F benzoxazine resin), and LZ-8290 (bisphenol A benzoxazine resin) available from Huntsman or HFB-2006M available from Showa High Polymer.

For example, in the styrene maleic anhydride resin, the ratio of styrene (S) to maleic anhydride (MA) may be for example 1:1, 2:1, 3:1, 4:1, 6:1, 8:1 or 12:1, examples including styrene maleic anhydride resins such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

The polyamide suitable for the present disclosure may be any polyamide resins known in the field to which this disclosure pertains, including but not limited to various commercially available polyamide resin products.

The polyimide suitable for the present disclosure may be any polyimide resins known in the field to which this disclosure pertains, including but not limited to various commercially available polyimide resin products.

Moreover, in addition to the aforesaid components, the resin composition disclosed herein may optionally further comprise flame retardant, inorganic filler, curing accelerator, polymerization inhibitor, solvent, silane coupling agent, surfactant, coloring agent, toughening agent, core-shell rubber, or a combination thereof.

In one embodiment, for example, the flame retardant suitable for the present disclosure may be any one or more flame retardants useful for preparing a prepreg, a resin film, a laminate or a printed circuit board, examples including but not limited to phosphorus-containing flame retardant, preferably comprising: ammonium polyphosphate, hydroquinone bis-(diphenyl phosphate), bisphenol A bis-(diphenyl phosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives (such as di-DOPO compounds) or resins, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

Unless otherwise specified, relative to 60 parts by weight of the maleimide resin used in the present disclosure, the amount of the aforesaid flame retardant is not particularly limited and may be 1 part by weight to 100 parts by weight, such as 1 part by weight to 50 parts by weight or 30 parts by weight to 50 parts by weight.

In one embodiment, for example, the inorganic filler suitable for the present disclosure may be any one or more inorganic fillers suitable for preparing a prepreg, a resin film, a laminate or a printed circuit board, examples including but not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like and can be optionally pretreated by a silane coupling agent.

Unless otherwise specified, relative to 60 parts by weight of the maleimide resin, the amount of the inorganic filler is not particularly limited and may be 10 parts by weight to 300 parts by weight. In addition, in one embodiment, the amount of the inorganic filler is two times of the total amount of the maleimide resin, the epoxy resin of Formula (I), the amine curing agent (such as the methylenebis(diethylaniline)), the prepolymer (if any) and other additives (if any).

In one embodiment, for example, the curing accelerator suitable for the present disclosure may comprise a catalyst, such as a Lewis base or a Lewis acid. The Lewis base may comprise imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP), 4-dimethylamino pyridine (DMAP) or a combination thereof. The Lewis acid may comprise metal salt compounds, such as those of manganese, iron, cobalt, nickel, copper and zinc, such as zinc octanoate or cobalt octanoate. The curing accelerator encompasses curing initiator such as a peroxide capable of producing free radicals, and examples of the curing initiator may comprise, but not limited to: dibenzoyl peroxide (BPO), dicumyl peroxide, 2,5-dimethyl-2,5-di(t-butylperoxy)hexane, 2,5-dimethyl-2,5-di(t-butylperoxy)-3-hexyne (25B), di-t-butyl peroxide, di(t-butylperoxyisopropyl)benzene, di(t-butylperoxy) phthalate, di(t-butylperoxy) isophthalate, t-butyl peroxybenzoate, 2,2-di(t-butylperoxy) butane, 2,2-di(t-butylperoxy)octane, 2,5-dimethyl-2,5-di (benzoylperoxy)hexane, lauroyl peroxide, t-hexyl peroxypivalate, dibutylperoxyisopropylbenzene, bis(4-t-butyl cyclohexyl) peroxydicarbonate or a combination thereof.

Unless otherwise specified, the amount of the curing accelerator used herein may be adjusted according to the need. For example, relative to 60 parts by weight of the maleimide resin, the amount of the aforesaid curing accelerator is not particularly limited and may be 0.1 part by weight to 5.0 parts by weight, such as 0.20 part by weight to 0.90 part by weight.

As used herein, the polymerization inhibitor is used to inhibit the polymerization reaction, and examples thereof are not particularly limited, which may include various molecule type polymerization inhibitors, stable free radical type polymerization inhibitors or a combination thereof known in the field to which this disclosure pertains. For example, molecule type polymerization inhibitors suitable for the present disclosure include but are not limited to phenols, quinones, arylamines, arene nitro compounds, sulfur-containing compounds, chlorides of metal with variable valency or a combination thereof; more specifically, molecule type polymerization inhibitors suitable for the present disclosure include but are not limited to phenol, hydroquinone, 4-tert-butylcatechol, benzoquinone, chloroquinone, 1,4-naphthoquinone, trimethylquinone, aniline, nitrobenzene, $Na_2S$, $FeCl_3$, $CuCl_2$ or a combination thereof. For example, stable free radical type polymerization inhibitors suitable for the present disclosure include but are not limited to 1,1-diphenyl-2-picrylhydrazyl radical (DPPH), triphenylmethyl radical or a combination thereof.

The purpose of adding solvent according to the present disclosure is to dissolve the components in the resin composition so as to change the solid content of the resin composition and to adjust the viscosity of the resin composition. For example, the solvent may comprise, but not limited to, methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methyl-pyrrolidone, or a mixture thereof.

The silane coupling agent suitable for the present disclosure may comprise silane (such as but not limited to siloxane), which may be further categorized according to the functional groups into amino silane, epoxide silane, vinyl silane, ester silane, hydroxyl silane, isocyanate silane, methacryloxy silane and acryloxy silane.

The purpose of surfactant used herein is to ensure uniform distribution of the inorganic filler in the resin composition.

The coloring agent suitable for the present disclosure may comprise, but not limited to, dye or pigment.

The purpose of toughening agent used herein is to improve the toughness of the resin composition. The toughening agent may comprise, but not limited to, carboxyl-terminated butadiene acrylonitrile rubber (CTBN rubber).

The resin compositions of various embodiments of the present disclosure may be processed by various methods into different articles, including but not limited to a prepreg, a resin film, a laminate or a printed circuit board.

For example, the resin compositions of various embodiments may be used to make prepregs.

In one embodiment, the prepreg disclosed herein has a reinforcement material and a layered structure formed thereon, wherein the layered structure is made by heating the resin composition at high temperature to a semi-cured state (B-stage). Suitable baking temperature for making the prepreg may be for example 140° C. to 180° C. The reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

In one embodiment, by well mixing the resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the article made from the resin composition disclosed herein may be a resin film which is prepared by heating and baking the resin composition to the semi-cured state. For example, by selectively coating the resin composition on a liquid crystal polymer film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 190° C. and 220° C. and preferably between 190° C. and 210° C., a suitable curing time being 60 to 180 minutes and preferably 60 to 150 minutes, and a suitable pressure being for example between 300 and 500 psi and preferably between 350 and 450 psi. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

In one embodiment, the laminate may be further processed by trace formation processes to obtain a printed circuit board.

In one embodiment of making a printed circuit board, a double-sided copper-clad laminate (such as product EM-891, available from Elite Material Co., Ltd.) with a thickness of 28 mil and having 1 ounce (oz) HVLP (hyper very low profile) copper foils may be used and subjected to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly containing a copper foil, the prepreg, the inner layer circuit board, the prepreg and a copper foil stacked in said order by heating at 190 to 240° C. for 60 to 180 minutes to cure the insulation material of the prepregs. Next, black oxidation, drilling, copper plating and other known circuit board processes are performed on the outmost copper foils so as to obtain the printed circuit board.

In one embodiment, the resin composition disclosed herein may achieve improvement in at least one or more of the following properties: article appearance (e.g., laminate appearance), glass transition temperature, percentage of storage modulus change, X-axis thermal expansion coefficient, dielectric constant, dissipation factor, and copper foil peeling strength.

For example, articles made from the resin compositions according to the present disclosure may achieve one, more or all of the following properties:

absence of weave exposure under visual inspection;

a glass transition temperature as measured by reference to IPC-TM-650 2.4.24.4 of greater than or equal to 260° C., such as greater than or equal to 280° C., such as between 260° C. and 400° C., such as between 260° C. and 380° C. or between 280° C. and 350° C.;

a percentage of storage modulus change between 50° C. and 250° C. as measured by reference to IPC-TM-650 2.4.24.4 of less than or equal to 20%, such as between 15% and 20%, such as between 15.73% and 19.81%;

an X-axis thermal expansion coefficient as measured by reference to IPC-TM-650 2.4.24.5 of less than or equal to 8.9 ppm/° C., such as less than or equal to 8.2 ppm/° C., such as between 6.5 ppm/° C. and 8.9 ppm/° C. or between 6.5 ppm/° C. and 8.2 ppm/° C.;

a dielectric constant as measured by reference to JIS C2565 at 10 GHz of less than or equal to 3.99, such as less than or equal to 3.97, such as between 3.81 and 3.99;

a dissipation factor as measured by reference to JIS C2565 at 10 GHz of less than or equal to 0.0071, such as less than or equal to 0.0070, or such as between 0.0063 and 0.0071 or between 0.0063 and 0.0070; and a copper foil peeling strength as measured by reference to IPC-TM-650 2.4.8 of greater than or equal to 4.0 lb/in.

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:
1. epoxy resin of Formula (I): HP-6000, available from DIC Corporation.
2. naphthalene-containing phenolic epoxy resin: NC-7000L, as shown below, available from Nippon Kayaku.

n is an integer of 0 to 10.
3. naphthalene-containing epoxy resin: HP-4710, as shown below, available from DIC Corporation.

4. biphenyl phenolic epoxy resin: NC-3000H, available from Nippon Kayaku.
5. dicyclopentadiene-containing epoxy resin: HP-7200H, available from DIC Corporation.
6. bisphenol A epoxy resin: BE-188, available from Chang Chun Plastics.
7. phenol novolac epoxy resin: PNE-177, available from Chang Chun Plastics.
8. naphthalene-containing methylphenol epoxy resin: HP-5000, as shown below, available from DIC Corporation.
9. 3,3'-dimethyl-5,5'-diethyl-4,4'-diphenylmethane bismaleimide: BMI-5100, available from Daiwakasei Industry Co., Ltd.
10. polyphenylmethane maleimide: BMI-2300, available from Daiwakasei Industry Co., Ltd.
11. bisphenol A diphenyl ether bismaleimide: BMI-4000, available from Daiwakasei Industry Co., Ltd.
12. 1,6-bismaleimido-(2,2,4-trimethyl)hexane: BMI-TMH, available from Daiwakasei Industry Co., Ltd.
13. 4,4'-methylenebis(2,6-diethylaniline): Mosacure 310, available from Lonza.
14. 4,4'-methylenebis(2-ethylaniline): Kayahard A-A, available from Nippon Kayaku.
15. high molecular weight (Mw) polyetheramine: D-2010, available from Huntsman.
16. diamino diphenyl sulfone: DDS, commercially available.
17. 4,4'-oxydianiline: ODA, commercially available.
18. 1,6-hexanediol diacrylate: SR-238NS, available from Sartomer.
19. vinylbenzyl-terminated polyphenylene ether: OPE-2st 1200, available from Mitsubishi Gas Chemical Co., Inc.
20. styrene-butadiene-styrene copolymer: T439, available from Asahi Kasei Corp.
21. spherical silica: SC2050-SEJ, available from Admatechs. The designation of "Y" represents that the amount of the inorganic filler is two times of the total amount of the maleimide resin, the epoxy resin, the amine curing agent, the prepolymer (if any) and other additives (if any). For example, the amount (Y) of the inorganic filler in Example E1 is 180 parts by weight, and the amount (Y) of the inorganic filler in Example E8 is 200 parts by weight.
22. 2-phenylimidazole: 2PZ, commercially available.
23. solvent: mixture of dimethylacetamide (DMAC) and methyl ethyl ketone (MEK) in a weight ratio of 2:1, prepared by Applicant. "PA" in the Tables represents a "proper amount" of solvent, which is the amount of solvent sufficient to dissolve all of the maleimide resin and all dissolvable solid reagents.
24. prepolymer: as prepared according to Synthesis Example 1.

Compositions and test results of resin compositions of Examples and Comparative Examples are listed below (in part by weight):

n is an integer of 0 to 10.

TABLE 1

Resin compositions of Examples (in part by weight) and test results

| | Component | E1 | E2 | E3 | E4 | E5 | E6 | E7 |
|---|---|---|---|---|---|---|---|---|
| epoxy resin | HP-6000 | 20 | 20 | 20 | 20 | 20 | 20 | 20 |
| | NC-7000L | | | 6 | | | | |
| | HP-4710 | | | 4 | | | | |
| | NC-3000H | | | 4 | | | | |
| | HP-7200H | | | | | | | |
| | BE-188 | | | | | | | |
| | PNE-177 | | | | | | | |
| | HP-5000 | | | | | | | |
| maleimide resin | BMI-5100 | | 30 | 30 | 30 | 30 | 30 | 20 |
| | BMI-2300 | 60 | 30 | 10 | 30 | 30 | 30 | 30 |
| | BMI-4000 | | | 10 | | | | 10 |
| | BMI-TMH | | | 10 | | | | |
| amine curing agent | Mosacure 310 | 10 | 10 | 10 | 10 | 10 | 10 | 10 |
| | Kayahard A-A | | | | | | | |
| | D-2010 | | | | | | | |
| | DDS | | | | | | | |
| | ODA | | | | | | | |
| prepolymer | Synthesis Example 1 | | | | | | | |
| other additive | SR-238NS | | | | | 10 | 3 | 20 |
| | OPE-2st 1200 | | | | | | | |
| | T439 | | | | | 10 | | |
| inorganic filler | SC2050-SEJ | Y | Y | Y | Y | Y | Y | Y |
| curing accelerator | 2PZ | 0.3 | 0.3 | 0.3 | 0.3 | 0.3 | 0.3 | 0.3 |
| solvent | DMAC:MEK = 2:1 | PA | PA | PA | PA | PA | PA | PA |

| Property | Unit | E1 | E2 | E3 | E4 | E5 | E6 | E7 |
|---|---|---|---|---|---|---|---|---|
| laminate appearance | none | OK | OK | OK | OK | OK | OK | OK |
| DMA Tg | °C. | >380 | 310 | 300 | 305 | 300 | 305 | 285 |
| storage modulus at 50° C. | Gpa | 1.92 | 1.87 | 1.72 | 2.67 | 2.38 | 2.12 | 2.53 |
| storage modulus at 250° C. | Gpa | 1.59 | 1.50 | 1.38 | 2.25 | 1.98 | 1.76 | 2.12 |
| percentage of storage modulus change | % | 17.19 | 19.79 | 19.77 | 15.73 | 16.81 | 16.98 | 16.21 |
| X-axis CTE | ppm/°C. | 7.2 | 7.0 | 7.3 | 6.5 | 6.8 | 7.2 | 6.7 |
| Dk@10 GHz | none | 3.96 | 3.92 | 3.95 | 3.85 | 3.81 | 3.85 | 3.82 |
| Df@10 GHz | none | 0.0069 | 0.0066 | 0.0067 | 0.0065 | 0.0064 | 0.0067 | 0.0063 |
| P/S | lb/in | 4.5 | 4.4 | 4.3 | 4.3 | 4.3 | 4.1 | 4.2 |

TABLE 2

Resin compositions of Examples (in part by weight) and test results

| | Component | E8 | E9 | E10 | E11 | E12 | E13 | E14 |
|---|---|---|---|---|---|---|---|---|
| epoxy resin | HP-6000 | 20 | 20 | 20 | 10 | 30 | 20 | 20 |
| | NC-7000L | | | | | | | |
| | HP-4710 | | | | | | | |
| | NC-3000H | | | | | | | |
| | HP-7200H | | | | | | | |
| | BE-188 | | | | | | | |
| | PNE-177 | | | | | | | |
| | HP-5000 | | | | | | | |
| maleimide resin | BMI-5100 | 30 | 20 | 20 | 20 | 20 | 20 | 20 |
| | BMI-2300 | 30 | 30 | 30 | 30 | 30 | 30 | 30 |
| | BMI-4000 | | | 10 | 10 | 10 | 10 | 10 |
| | BMI-TMH | | | | | | | |
| amine curing agent | Mosacure 310 | 10 | 5 | 30 | 10 | 10 | 2 | 40 |
| | Kayahard A-A | | | | | | | |
| | D-2010 | | | | | | | |
| | DDS | | | | | | | |
| | ODA | | | | | | | |

TABLE 2-continued

Resin compositions of Examples (in part by weight) and test results

| | | | | | | | | |
|---|---|---|---|---|---|---|---|---|
| prepolymer | Synthesis Example 1 | | | | | | | |
| other additive | SR-238NS | | | | | | | |
| | OPE-2st 1200 | 10 | | | | | | |
| | T439 | | | | | | | |
| inorganic filler | SC2050-SEJ | Y | Y | Y | Y | Y | Y | Y |
| curing accelerator | 2PZ | 0.3 | 0.3 | 0.3 | 0.3 | 0.3 | 1.3 | 2.3 |
| solvent | DMAC:MEK = 2:1 | PA | PA | PA | PA | PA | PA | PA |

| Property | Unit | E8 | E9 | E10 | E11 | E12 | E13 | E14 |
|---|---|---|---|---|---|---|---|---|
| laminate appearance | none | OK | OK | OK | OK | OK | OK | OK |
| DMA Tg | °C. | 290 | 345 | 285 | 320 | 280 | 350 | 260 |
| storage modulus at 50° C. | Gpa | 1.94 | 1.84 | 1.99 | 1.72 | 2.12 | 1.72 | 2.36 |
| storage modulus at 250° C. | Gpa | 1.60 | 1.50 | 1.67 | 1.42 | 1.70 | 1.38 | 1.92 |
| percentage of storage modulus change | % | 17.53 | 18.48 | 16.08 | 17.44 | 19.81 | 19.77 | 18.64 |
| X-axis CTE | ppm/°C. | 7.7 | 8.2 | 6.6 | 8.1 | 7.3 | 8.9 | 7.2 |
| Dk@10 GHz | none | 3.96 | 3.96 | 3.83 | 3.92 | 3.97 | 3.99 | 3.81 |
| Df@10 GHz | none | 0.0067 | 0.0070 | 0.0066 | 0.0064 | 0.0070 | 0.0071 | 0.0065 |
| P/S | lb/in | 4.6 | 4.5 | 4.0 | 4.2 | 4.8 | 4.2 | 4.7 |

TABLE 3

Resin compositions of Comparative Examples (in part by weight) and test results

| | Component | C1 | C2 | C3 | C4 | C5 | C6 | C7 |
|---|---|---|---|---|---|---|---|---|
| epoxy resin | HP-6000 | | 20 | | | | 20 | 20 |
| | NC-7000L | | | | | | | |
| | HP-4710 | | | | | | | |
| | NC-3000H | | | | | | | |
| | HP-7200H | 20 | | | 10 | | | |
| | BE-188 | | | 10 | 5 | | | |
| | PNE-177 | | | 10 | 5 | | | |
| | HP-5000 | | | | | | | |
| maleimide resin | BMI-5100 | | | | | | | |
| | BMI-2300 | 60 | 60 | 60 | 60 | 60 | 60 | 60 |
| | BMI-4000 | | | | | | | |
| | BMI-TMH | | | | | | | |
| amine curing agent | Mosacure 310 | 10 | | 10 | 10 | 10 | | |
| | Kayahard A-A | | 10 | | | | | |
| | D-2010 | | | | | | 10 | |
| | DDS | | | | | | | 10 |
| | ODA | | | | | | | |
| prepolymer | Synthesis Example 1 | | | | | | | |
| other additive | SR-238NS | | | | | | | |
| | OPE-2st 1200 | | | | | | | |
| | T439 | | | | | | | |
| inorganic filler | SC2050-SEJ | Y | Y | Y | Y | Y | Y | Y |
| curing accelerator | 2PZ | 0.3 | 0.3 | 0.3 | 0.3 | 0.3 | 0.3 | 0.3 |
| solvent | DMAC:MEK = 2:1 | PA | PA | PA | PA | PA | PA | PA |

| Property | Unit | C1 | C2 | C3 | C4 | C5 | C6 | C7 |
|---|---|---|---|---|---|---|---|---|
| laminate appearance | none | OK | dry board | OK | OK | dry board | dry board | OK |
| DMA Tg | °C. | 285 | 320 | 270 | 275 | >380 | 240 | 280 |
| storage modulus at 50° C. | Gpa | 2.15 | 1.84 | 2.66 | 2.42 | 1.88 | 1.69 | 1.72 |
| storage modulus at 250° C. | Gpa | 1.48 | 1.46 | 1.78 | 1.77 | 1.58 | 1.25 | 1.32 |
| percentage of storage modulus change | % | 31.16 | 20.65 | 33.08 | 26.86 | 15.96 | 26.04 | 23.26 |

TABLE 3-continued

Resin compositions of Comparative Examples (in part by weight) and test results

| | | | | | | | | |
|---|---|---|---|---|---|---|---|---|
| X-axis CTE | ppm/° C. | 10.8 | 9.2 | 11.2 | 11.0 | 9.2 | 10.8 | 10.6 |
| Dk@10 GHz | none | 4.05 | 3.97 | 4.12 | 4.10 | 3.88 | 4.02 | 4.04 |
| Df@10 GHz | none | 0.0088 | 0.0067 | 0.0102 | 0.0092 | 0.0061 | 0.0097 | 0.0092 |
| P/S | lb/in | 4.8 | 4.6 | 5.2 | 5.0 | 2.5 | 4.2 | 4.5 |

TABLE 4

Resin compositions of Comparative Examples (in part by weight) and test results

| | Component | C8 | C9 | C10 | C11 | C12 | C13 | C14 |
|---|---|---|---|---|---|---|---|---|
| epoxy resin | HP-6000 | 20 | 20 | 20 | | | 20 | 20 |
| | NC-7000L | | | | | | | |
| | HP-4710 | | | | | | | |
| | NC-3000H | | | | | | | |
| | HP-7200H | | | | | | | |
| | BE-188 | | | | | | | |
| | PNE-177 | | | | | | | |
| | HP-5000 | | | | 20 | 20 | | |
| maleimide resin | BMI-5100 | | | | | | 30 | 30 |
| | BMI-2300 | 60 | | | 60 | 30 | 30 | |
| | BMI-4000 | | | | | | | |
| | BMI-TMH | | | | | | | |
| amine curing agent | Mosacure 310 | | 10 | | 10 | 10 | | |
| | Kayahard A-A | | | | | | | 10 |
| | D-2010 | | | | | | | |
| | DDS | | | | | | | |
| | ODA | | 10 | | | | | |
| prepolymer | Synthesis Example 1 | | | 70 | 70 | | | |
| other additive | SR-238NS | | | | | | | |
| | OPE-2st 1200 | | | | | | | |
| | T439 | | | | | | | |
| inorganic filler | SC2050-SEJ | Y | Y | Y | Y | Y | Y | Y |
| curing accelerator | 2PZ | 0.3 | 0.3 | 0.3 | 0.3 | 0.3 | 0.3 | 0.3 |
| solvent | DMAC:MEK = 2:1 | PA | PA | PA | PA | PA | PA | PA |

| Property | Unit | C8 | C9 | C10 | C11 | C12 | C13 | C14 |
|---|---|---|---|---|---|---|---|---|
| laminate appearance | none | OK | OK | OK | OK | OK | OK | OK |
| DMA Tg | ° C. | 270 | 260 | 280 | 275 | 255 | 295 | 275 |
| storage modulus at 50° C. | Gpa | 1.86 | 2.33 | 1.72 | 1.99 | 1.74 | 1.98 | 1.79 |
| storage modulus at 250° C. | Gpa | 1.36 | 1.92 | 1.33 | 1.48 | 1.38 | 1.56 | 1.32 |
| percentage of storage modulus change | % | 26.88 | 17.60 | 22.67 | 25.63 | 20.69 | 21.21 | 26.26 |
| X-axis CTE | ppm/° C. | 11.5 | 11.2 | 9.2 | 11.2 | 12.1 | 8.2 | 9.2 |
| Dk@10 GHz | none | 3.98 | 4.18 | 4.02 | 4.23 | 4.25 | 3.97 | 3.99 |
| Df@10 GHz | none | 0.0089 | 0.0098 | 0.0075 | 0.0098 | 0.0096 | 0.0070 | 0.0069 |
| P/S | lb/in | 4.3 | 5.2 | 4.7 | 4.5 | 4.8 | 4.2 | 3.9 |

Synthesis Example 1

150 parts by weight of dimethylacetamide was added to a glass stirred reaction tank, followed by adding 60 parts by weight of BMI-2300 and 10 parts by weight of Mosacure 310 and continuously stirring at 105° C. for 12 hours to obtain a prepolymer resin, which was then processed with a vacuum solvent removal device to remove the solvent so as to obtain a solid state prepolymer.

Samples (specimens) for the properties measured above were prepared as described below and tested and analyzed under specified conditions below.
1. Prepreg: Resin composition from each Example (listed in Table 1 and Table 2) or each Comparative Example (listed in Table 3 and Table 4) was respectively well-mixed to form a varnish, in which the dissolvable solid state chemical reagents were all dissolved. Then the varnish was loaded to an impregnation tank, and a fiberglass fabric (e.g., 1080 or 2116 E-glass fiber fabric, available from Asahi) was impregnated into the impregnation tank to adhere the resin composition onto the fiberglass fabric, followed by heating at 150° C. to 170° C. to the semi-cured state (B-stage) to obtain a prepreg. Prepregs made from the 1080 glass fiber fabrics have a resin content of about 70%, and prepregs made from the 2116 fiberglass fabrics have a resin content of about 52% or about 45%.
2. Copper-free laminate (2-ply, formed by lamination of two prepregs, resin content of about 70%): Two 18 μm thickness RTFs (reverse treated copper foils) and two prepregs obtained from 1080 E-glass fiber fabrics impregnated with each Example or Comparative Example were prepared and stacked in the order of one copper foil, two prepregs and one copper foil, followed by lamination and curing under vacuum at 420 psi and 220° C. for 1 hour to form a copper-clad laminate (2-ply, formed by lamination of two prepregs). Next, each copper-clad laminate was etched to remove the copper foils on both sides to obtain a copper-free laminate (2-ply) which is formed by laminating two prepregs and has a resin content of about 70%.

3. Copper-free laminate (2-ply, formed by lamination of two prepregs, resin content of about 45%): Two 18 μm thickness RTFs (reverse treated copper foils) and two prepregs obtained from 2116 E-glass fiber fabrics impregnated with each Example or Comparative Example were prepared and stacked in the order of one copper foil, two prepregs and one copper foil, followed by lamination and curing under vacuum at 420 psi and 220° C. for 1 hour to form a copper-clad laminate (2-ply, formed by lamination of two prepregs). Next, each copper-clad laminate was etched to remove the copper foils on both sides to obtain a copper-free laminate (2-ply) which is formed by laminating two prepregs and has a resin content of about 45%.

4. Copper-free laminate (8-ply, formed by lamination of eight prepregs, resin content of about 52%): Two 18 μm thickness RTFs (reverse treated copper foils) and eight prepregs obtained from 2116 E-glass fiber fabrics impregnated with each Example or Comparative Example were prepared and stacked in the order of one copper foil, eight prepregs and one copper foil, followed by lamination and curing under vacuum at 420 psi and 220° C. for 1 hour to form a copper-clad laminate (8-ply, formed by lamination of eight prepregs). Next, each copper-clad laminate was etched to remove the copper foils on both sides to obtain a copper-free laminate (8-ply) which has a resin content of about 52%.

For each sample, test items and test methods are described below.

Laminate Appearance

Figure 1:
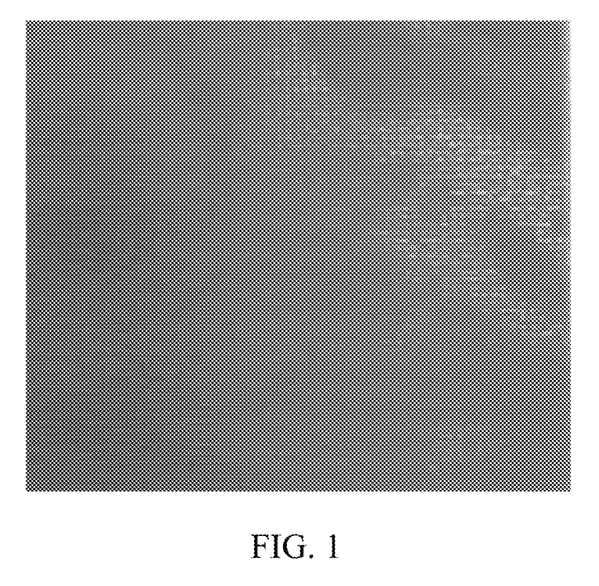
FIG. 1 shows the appearance of a laminate with dry board.
Figure 2:
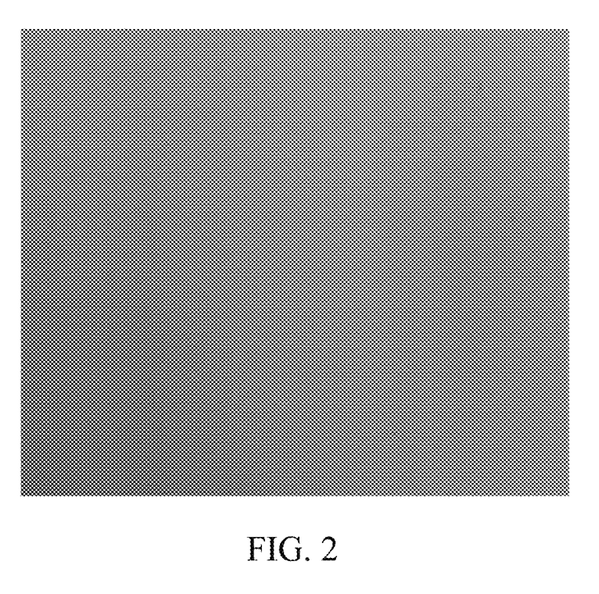
FIG. 2 shows the appearance of a normal laminate.

The aforesaid copper-free laminate (obtained by laminating eight prepregs) was subjected to visual inspection with naked eyes to determine whether dry board (as illustrated in FIG. 1, forming weave exposure) of the laminate was present on the surface of the outmost insulation layer of the copper-free laminate. Absence of dry board represents normal appearance of the laminate (as illustrated in FIG. 2). A designation of "OK" in the test result was given to represent normal appearance of the laminate. If dry board was observed, a designation of "dry board" was given.

Glass Transition Temperature (Tg)

A copper-free laminate sample (obtained by laminating eight prepregs) was subjected to the glass transition temperature measurement. The glass transition temperature (in ° C.) of each sample was measured using a dynamic mechanical analysis (DMA) method by reference to IPC-TM-650 2.4.24.4 at a temperature range of 35° C. to 380° C. with a temperature increase rate of 2° C./minute. Higher glass transition temperature represents a better property of the sample. If no turns were found in the curve from 35° C. to 380° C., a designation of ">380" was given to represent a glass transition temperature of the sample of above 380° C.

Percentage of Storage Modulus Change (a.k.a. Ratio of Storage Modulus Variation)

A copper-free laminate sample (obtained by laminating eight prepregs) was subjected to the percentage of storage modulus change measurement. The storage modulus of each sample was measured by using a dynamic mechanical analysis (DMA) method by reference to IPC-TM-650 2.4.24.4 at a temperature range of 35° C. to 380° C. with a temperature increase rate of 2° C./minute; the storage modulus (in GPa) at 50° C. and the storage modulus at 250° C. (in GPa) were record to calculate the percentage of change (in %):

percentage of storage modulus change=((storage modulus at 50° C.−storage modulus at 250° C.)/storage modulus at 50° C.)*100%.

Lower percentage of storage modulus change represents lower deformation degree and is therefore more preferred. A difference in the percentage of storage modulus change of greater than or equal to 1% represents a substantial difference.

Thermal Expansion Coefficient (a.k.a. Coefficient of Thermal Expansion, CTE) The copper-free laminate (2-ply, resin content of about 45%) sample was subjected to thermal mechanical analysis (TMA) during the measurement of X-axis thermal expansion coefficient. The copper-free laminate was cut into a sample with a length of 15 mm and a width of 2 mm having a thickness of 8 mil. Each sample was heated from 50° C. to 260° C. at a temperature increase rate of 5° C./minute and then subjected to the measurement of thermal expansion coefficient (ppm/° C.) in X-axis in a range ($\alpha 1$) from 40° C. to 125° C. by reference to the processes described in IPC-TM-650 2.4.24.5. Lower X-axis thermal expansion coefficient represents a better dimensional expansion property. A difference in the X-axis thermal expansion coefficient of greater than or equal to 0.1 ppm/° C. represents a substantial difference.

Dielectric Constant (Dk)

In the dielectric constant measurement, the copper-free laminate (2-ply, resin content of about 70%) was tested by using a microwave dielectrometer available from AET Corp. by reference to JIS C2565 "Measuring methods for ferrite cores for microwave device" at 10 GHz for analyzing each sample. Lower dielectric constant represents better dielectric properties of the sample. Under a 10 GHz frequency, a difference in Dk of less than 0.01 represents no substantial difference in dielectric constant of different laminates, and a difference in Dk of greater than or equal to 0.01 represents a substantial difference in dielectric constant of different laminates. Dk value has no unit.

Dissipation Factor (Df)

In the dissipation factor measurement, the copper-free laminate (2-ply, resin content of about 70%) was tested by using a microwave dielectrometer available from AET Corp. by reference to JIS C2565 "Measuring methods for ferrite cores for microwave device" at 10 GHz for analyzing each sample. Lower dissipation factor represents better dielectric properties of the sample. Under a 10 GHz frequency, a difference in Df of less than 0.0001 represents no substantial difference in dissipation factor of different laminates, and a difference in Df of greater than or equal to 0.0001 represents a substantial difference in dissipation factor of different laminates. Df value has no unit.

Copper Foil Peeling Strength (a.k.a. Peeling Strength, P/S)

The aforesaid copper-clad laminate (obtained by laminating eight prepregs) was cut into a rectangular sample with a width of 24 mm and a length of greater than 60 mm, which was etched to remove surface copper foil to leave a rectangular copper foil strip with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the technical field to which the present disclosure pertains, higher copper foil peeling strength is better. A difference in copper foil peeling strength of greater than or equal to 0.1 lb/in represents a substantial difference.

The following observations can be made according to the test results above.

The resin composition of Example E1, which uses 20 parts by weight of an epoxy resin of Formula (I) according to the present disclosure, compared with Comparative Examples C1, C3 and C4 which respectively contain 20 parts by weight of an epoxy resin different from the one of Formula (I), achieves a better glass transition temperature, a better percentage of storage modulus change, a better X-axis thermal expansion coefficient, a better dielectric constant and a better dissipation factor.

The resin composition of Example E1, which uses 10 parts by weight of a methylenebis(diethylaniline) according to the present disclosure, compared with Comparative Example C2 which contains 10 parts by weight of another amine curing agent, achieves a better laminate appearance, a better percentage of storage modulus change and a better X-axis thermal expansion coefficient.

Compared with Example E1, it is found that a resin composition not containing an epoxy resin, such as Comparative Example C5, has a poor laminate appearance, a poor X-axis thermal expansion coefficient and a poor copper foil peeling strength.

The resin composition of Example E1, which uses 10 parts by weight of a methylenebis(diethylaniline) according to the present disclosure, compared with Comparative Examples C6, C7 and C8 which contain 10 parts by weight of another amine curing agent, achieves a better laminate appearance, a better glass transition temperature, a better percentage of storage modulus change, a better X-axis thermal expansion coefficient, a better dielectric constant and a better dissipation factor.

Compared with Example E1, it is found that a resin composition not containing a maleimide resin, such as Comparative Example C9, has a poor glass transition temperature, a poor X-axis thermal expansion coefficient, a poor dielectric constant and a poor dissipation factor.

In addition, by observing Comparative Examples C10 and C11, it is found that if the maleimide resin and the methylenebis(diethylaniline) are prepolymerized prior to the addition to the resin composition, properties including percentage of storage modulus change, X-axis thermal expansion coefficient, dielectric constant and dissipation factor will all become worse.

The resin composition of Example E1, which uses 20 parts by weight of an epoxy resin of Formula (I) according to the present disclosure, compared with Comparative Example C12 which contains 20 parts by weight of a naphthalene-containing methylphenol epoxy resin, achieves a better glass transition temperature, a better percentage of storage modulus change, a better X-axis thermal expansion coefficient, a better dielectric constant and a better dissipation factor.

The resin composition of Example E2, which uses 20 parts by weight of an epoxy resin of Formula (I) according to the present disclosure, compared with Comparative Example C13 which contains 20 parts by weight of a naphthalene-containing phenolic epoxy resin, achieves a better percentage of storage modulus change.

The resin composition of Example E2, which uses 20 parts by weight of an epoxy resin of Formula (I) according to the present disclosure and 10 parts by weight of a methylenebis(diethylaniline), compared with Comparative Example C14 which contains 20 parts by weight of a naphthalene-containing phenolic epoxy resin and 10 parts by weight of another amine curing agent, achieves a better glass transition temperature, a better percentage of storage modulus change, a better X-axis thermal expansion coefficient, and a better copper foil peeling strength.

Overall, the resin composition according to the present disclosure may achieve a better percentage of storage modulus change and a better X-axis thermal expansion coefficient at the same time. In addition, the resin composition according to the present disclosure has one, more or all of the following properties: absence of weave exposure under visual inspection; a glass transition temperature as measured by reference to IPC-TM-650 2.4.24.4 of greater than or equal to 260° C.; a percentage of storage modulus change between 50° C. and 250° C. as measured by reference to IPC-TM-650 2.4.24.4 of less than or equal to 20%; an X-axis thermal expansion coefficient as measured by reference to IPC-TM-650 2.4.24.5 of less than or equal to 8.9 ppm/° C.; a dielectric constant as measured by reference to JIS C2565 at 10 GHz of less than or equal to 3.99; a dissipation factor as measured by reference to JIS C2565 at 10 GHz of less than or equal to 0.0071; and a copper foil peeling strength as measured by reference to IPC-TM-650 2.4.8 of greater than or equal to 4.0 lb/in.

The above detailed description is merely illustrative in nature and is not intended to limit the embodiments of the subject matter or the application and use of such embodiments. As used herein, the term "exemplary" means "serving as an example, instance, or illustration." Any implementation described herein as exemplary is not necessarily to be construed as preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and foreseeable equivalents at the time of filing this patent application.

What is claimed is:

1. A resin composition, comprising:
   60 parts by weight of a maleimide resin;
   10 parts by weight to 30 parts by weight of an epoxy resin of Formula (I):

Formula (I)

wherein n is an integer of 0 to 10; and
  5 parts by weight to 30 parts by weight of a methylenebis(diethylaniline).

2. The resin composition of claim 1, wherein the maleimide resin comprises 4,4'-diphenylmethane bismaleimide, polyphenylmethane maleimide, bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl)hexane, N-2,3-xylylmaleimide, N-2,6-xylylmaleimide, N-phenyl maleimide, vinyl benzyl maleimide, maleimide resin containing aliphatic long chain structure, prepolymer of diallyl compound and maleimide resin, prepolymer of diamine and maleimide resin, prepolymer of multi-functional amine and maleimide resin, prepolymer of acid phenol compound and maleimide resin, or a combination thereof.

3. The resin composition of claim 1, further comprising polyphenylene ether resin, cyanate ester resin, active ester, vinylbenzyl-dicyclopentadiene phenylene ether, bis(vinylbenzyl)ether, 1,2-bis(vinylphenyl)ethane, divinylbenzene, triallyl isocyanurate, triallyl cyanurate, 1,2,4-trivinyl cyclohexane, diallyl bisphenol A, styrene, acrylate, polyolefin, epoxy resin, phenolic resin, benzoxazine resin, styrene maleic anhydride resin, polyamide, polyimide, or a combination thereof.

4. The resin composition of claim 1, further comprising flame retardant, inorganic filler, curing accelerator, polymerization inhibitor, solvent, silane coupling agent, surfactant, coloring agent, toughening agent, core-shell rubber, or a combination thereof.

5. An article made from the resin composition of claim 1, comprising a prepreg, a resin film, a laminate or a printed circuit board.

6. The article of claim 5, characterized by absence of weave exposure under visual inspection.

7. The article of claim 5, having a glass transition temperature as measured by reference to IPC-TM-650 2.4.24.4 of greater than or equal to 280° C.

8. The article of claim 5, having a percentage of storage modulus change between 50° C. and 250° C. as measured by reference to IPC-TM-650 2.4.24.4 of less than or equal to 20%.

9. The article of claim 5, having an X-axis thermal expansion coefficient as measured by reference to IPC-TM-650 2.4.24.5 of less than or equal to 8.2 ppm/° C.

10. The article of claim 5, having a dielectric constant as measured by reference to JIS C2565 at 10 GHz of less than or equal to 3.97.

11. The article of claim 5, having a dissipation factor as measured by reference to JIS C2565 at 10 GHz of less than or equal to 0.0070.

* * * * *